United States Patent
Tsuchiya

(10) Patent No.: US 10,567,610 B2
(45) Date of Patent: Feb. 18, 2020

(54) IMAGE FORMING APPARATUS THAT EXECUTES CORRELATED OPERATION CORRELATED WITH DOCUMENT PLACEMENT ON DOCUMENT PLACEMENT PLATE OR CONTACT GLASS

(71) Applicant: KYOCERA Document Solutions Inc., Osaka (JP)

(72) Inventor: Masaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/117,968

(22) Filed: Aug. 30, 2018

(65) Prior Publication Data

US 2019/0068822 A1    Feb. 28, 2019

(30) Foreign Application Priority Data

Aug. 30, 2017 (JP) ................................ 2017-165388

(51) Int. Cl.
| | |
|---|---|
| *H04N 1/04* | (2006.01) |
| *H04N 1/12* | (2006.01) |
| *H04N 1/00* | (2006.01) |

(52) U.S. Cl.
CPC .......... *H04N 1/12* (2013.01); *H04N 1/00018* (2013.01); *H04N 1/0057* (2013.01); *H04N 1/00411* (2013.01); *H04N 1/00689* (2013.01)

(58) Field of Classification Search
None
See application file for complete search history.

(56) References Cited

U.S. PATENT DOCUMENTS

| | | | |
|---|---|---|---|
| 2008/0231890 A1 | 9/2008 | Kishi | |
| 2019/0068822 A1* | 2/2019 | Tsuchiya | .................. H04N 1/12 |

FOREIGN PATENT DOCUMENTS

| | | |
|---|---|---|
| JP | H05-063904 A | 3/1993 |
| JP | 2001-197251 A | 7/2001 |
| JP | 2008-228036 A | 9/2008 |

\* cited by examiner

*Primary Examiner* — Cheukfan Lee
(74) *Attorney, Agent, or Firm* — Hawaii Patent Services; Nathaniel K. Fedde; Kenton N. Fedde

(57) ABSTRACT

Provided is an image forming apparatus capable of improving the convenience of standard functions that are used often. A storage unit stores correlated-operation information, in which correlated operations that are correlated with a document-placement plate and the contact glass respectively as document placement locations, is registered for each user. A correlated-operation-executing unit references correlated-operation information of a user authenticated by a user-authenticating unit. The correlated-operation-executing unit executes a correlated operation correlated with placement of a document on the document-placement plate when a placement-detecting sensor detects placement of a document on the document-placement plate. The correlated-operation-executing unit executes a correlated operation correlated with placement of a document on the contact glass when an open/closed-detecting sensor detects opening/closing of a pressure plate.

3 Claims, 6 Drawing Sheets

FIG.5A

SET TO CORRELATED-OPERATION MODE

| PLACEMENT LOCATION | CONTACT GLASS 21 | |
|---|---|---|
| PRIORITY ORDER | 1 | 2 |
| FUNCTION TO BE EXECUTED | COPY | FAX |
| FUNCTION SETTING | 10 COPIES | FINE |

| PLACEMENT LOCATION | DOCUMENT PLACEMENT PLATE 31 | |
|---|---|---|
| PRIORITY ORDER | 1 | 2 |
| FUNCTION TO BE EXECUTED | STORE | TRANSMIT |
| FUNCTION SETTING | BOX A | 400dpi |

SETTING CANCELLATION — 101

SET TO CORRELATED-OPERATION MODE

[SETTING CANCELLATION]

| PLACEMENT LOCATION | CONTACT GLASS 21 | |
|---|---|---|
| PRIORITY ORDER | 1 | 2 |
| FUNCTION TO BE EXECUTED | COPY | FAX |
| FUNCTION SETTING | 10 COPIES | FINE |

| PLACEMENT LOCATION | DOCUMENT PLACEMENT PLATE 31 | |
|---|---|---|
| PRIORITY ORDER | 1 | 2 |
| FUNCTION TO BE EXECUTED | COPY | TRANSMIT |
| FUNCTION SETTING | 150% ENLARGEMENT | 400dpi |

IMAGE FORMING APPARATUS THAT EXECUTES CORRELATED OPERATION CORRELATED WITH DOCUMENT PLACEMENT ON DOCUMENT PLACEMENT PLATE OR CONTACT GLASS

INCORPORATION BY REFERENCE

This application is based on and claims the benefit of priority from Japanese Patent Application No. 2017-165388 filed on Aug. 30, 2017, the contents of which are hereby incorporated by reference.

BACKGROUND

The present disclosure relates to an image forming apparatus that includes a document-feeding unit that feeds a document placed on a document-placement plate one sheet at a time, and a document-reading unit that reads a document that is fed from the document-feeding unit and a document that is placed on a contact glass.

Conventionally, as an image forming apparatus that includes a document-reading unit that reads a document, electronic copy machines, and multifunction peripherals (MFP) that include a plurality of different functions such as a facsimile function and the like that process read image data are known. In this kind of image forming apparatus, a selection of a function, or input for various settings is received, and the selected function is executed according to the inputted settings.

In recent years, techniques have been proposed that improve work efficiency by reducing the selection of functions and the input of various settings. For example, in a typical technique, the efficiency of copying work is improved by automatically starting the copying work in accordance to opening/closing of a pressure plate that applies pressure to a document from the back surface after the document has been placed on a contact glass. In addition, in another typical technique, the efficiency of usage is improved by performing settings of desired functions to be used from a portable terminal, and then by authenticating the user, performing function settings of the image forming apparatus to match the state set with the portable terminal.

SUMMARY

The image forming apparatus according to the present disclosure is an image forming apparatus having a document-feeding unit that feeds documents placed on a document-placement plate one sheet at a time, a document-reading unit that reads documents that are fed from the document-feeding unit and documents that are placed on a contact glass, and including a plurality of functions that are executed on an image read by the document-reading unit. The image forming apparatus includes a placement-detecting sensor, an open/closed-detecting sensor, a user-authenticating unit, a storage unit, and a correlated-operation-executing unit. The placement-detecting sensor detects placement of a document on the document-placement plate. The open/closed-detecting sensor detects opening/closing of a pressure plate that opens/closes the contact glass. The user-authenticating unit authenticates a user. The storage unit stores correlated-operation information, in which correlated operations that are correlated with the document-placement plate and the contact glass respectively as document placement locations, is registered for each user. The correlated-operation-executing unit, by referencing the correlated-operation information of a user authenticated by the user-authenticating unit, executes a correlated operation correlated with placement of a document on the document-placement plate when the placement-detecting sensor detects placement of a document on the document-placement plate, and executes a correlated operation correlated with placement of a document on the contact glass when the open/closed-detecting sensor detects opening/closing of the pressure plate.

BRIEF DESCRIPTION OF THE DRAWINGS

FIG. 5A illustrates an example of a guidance screen that is displayed on a liquid-crystal display unit illustrated in FIG. 1.

FIG. 5B illustrates an example of a guidance screen that is displayed on a liquid-crystal display unit illustrated in FIG. 1.

DETAILED DESCRIPTION

Next, embodiments according to the present disclosure will be explained in detail with reference to the drawings.

An image forming apparatus 1 of this embodiment is a multifunction peripheral (MFP). The image forming apparatus 1, together with including a scanner function, includes a copy function, a FAX function, a transmitting function, a storage function and the like. The scanner function is a function for reading a document image. The copy function is a function as a copy machine that records a read image on recording paper. The FAX function is a function as a facsimile apparatus that transmits a facsimile of a read image. The transmission function is a function as a communicating apparatus that transmits data of a read image. The storage function is a function as a storage apparatus that stores read images.

Figure 1:
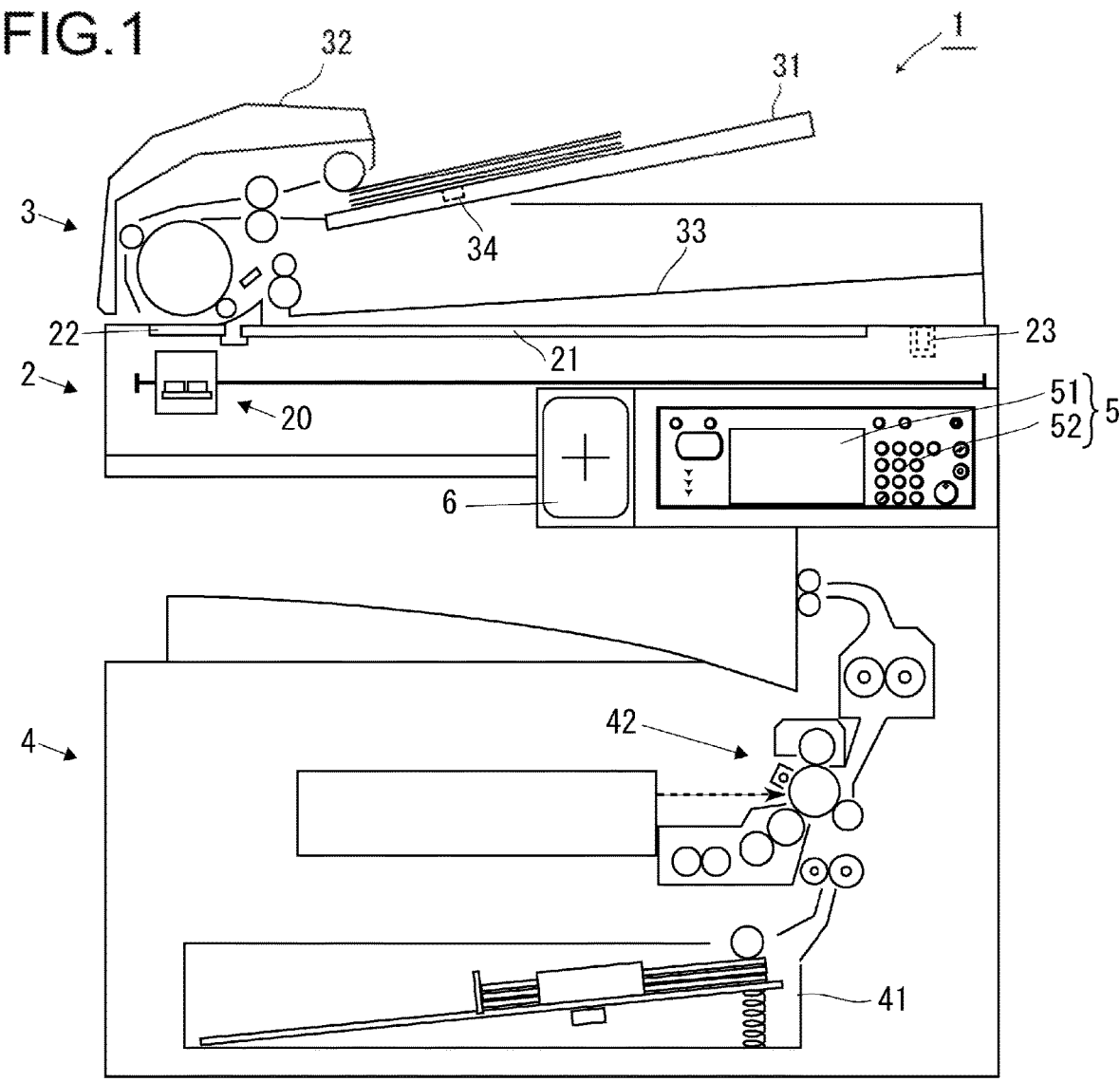
FIG. 1 is a schematic cross-sectional view illustrating the internal configuration of an image forming apparatus according to the present disclosure.

Referring to FIG. 1, the image forming apparatus 1 includes a document-reading unit 2, a document-feeding unit 3, a main unit 4, an operation unit 5, and a card reader 6. The document-reading unit 2 is arranged in an upper portion of the main unit 4. The document-feeding unit 3 is arranged in an upper portion of the document-reading unit 2. The operation unit 5 and the card reader 6 are arranged on the front side of the image forming apparatus 1.

The operation unit 5 that is used for performing settings and operation instructions of the image forming apparatus 1 is arranged on the front side of the image forming apparatus 1. The operation unit 5 is provided with a liquid-display unit 51 and operation buttons 52. By operating the operation unit 5 and inputting an instruction, a user performs various settings of the image forming apparatus 1 and causes the image forming apparatus 1 to execute various functions such as image formation and the like. The liquid-crystal-display unit 51 displays the state of the image forming apparatus 1. The liquid-crystal-display unit 51 displays the image forming status, the number for copies to print, and the like. As a touch-panel, the liquid-crystal-display unit 51 can be used to perform various settings such as for functions like double-sided printing, black-and-white reversal, image magnification setting, a density setting, and the like. A start button, a stop/clear button, a reset button, a numeric keypad, and the like are provided as the operation buttons 52. The start button is used by the user to instruct the start of image formation. The start/clear button is used when stopping image formation or the like. The reset button is used when setting the various settings of the image forming apparatus 1 to the default state.

The document-reading unit 2 includes a scanner 20, a contact glass 21, and a slit glass 22. The scanner 20 is configured so as to be able to move in the conveying direction of a document by the document-feeding unit 3 (sub-scanning direction). The contact glass 21 includes a rectangular transparent member such as glass or the like, and is a document table that is arranged on the upper surface of the document-reading unit 2. The slit glass 22 is formed in a direction perpendicular to the conveying direction of a document by the document-feeding unit 3. The scanner 20 includes a light source, a light-receiving unit, and a carriage. The light-receiving unit includes a complementary metal oxide semiconductor (CMOS) line sensor or the like that is arranged in the main scanning direction. The carriage houses the light source and the light-receiving unit.

The document-feeding unit 3 includes a document-placement plate 31, a document-conveying mechanism 32, a document-discharging unit 33, and a placement-detecting sensor 34. Documents that are placed on the document-placement plate 31 are sequentially fed by the document-conveying mechanism 32 one sheet at time to a position facing the slit glass 22, and then discharged by the document-discharging unit 33. The placement-detecting sensor 34 is a sensor that detects the placement of documents on the document-placement plate 31. The placement-detecting sensor 34 includes, for example, a reflection-type optical sensor. In this embodiment, the placement-detecting sensor 34 is turned ON when documents are placed on the document-placement plate 31.

The document-feeding unit 3 and the document-reading unit 2 are connected on the rear side of the image forming apparatus 1 by a hinge mechanism. Then, configuration is such that by opening the document-feeding unit 3 upward from the front side, the contact glass 21 on the upper surface of the document-reading unit 2 can be opened. In addition, the surface of the document-feeding unit 3 that faces the contact glass 21 is a white document-pressing surface. Then, the document-pressing surface functions as a pressure plate that opens/closes the document-feeding unit 3 to the contact glass 21.

An open/closed-detecting sensor 23 is provided in the document-reading unit 2 as an open/closed detecting unit that detects opening/closing of the document-feeding unit 3 (pressure plate). The open/closed-detecting sensor 23, for example, includes a microswitch having a protrusion that protrudes upward further than the contact glass 21. In this embodiment, the open/closed sensor 23 is turned ON when the document-feeding unit 3 (pressure plate) is open. Moreover, the open/closed-detecting sensor 23 is turned OFF when the document-feeding unit 3 (pressure plate) is closed.

When the operation buttons 52 of the operation unit 5 are used to give an instruction to read a document in a state in which a document is not placed on the document-placement plate 31, or in a state in which the document-feeding unit 3 (pressure plate) is open, a document that is placed on the contact glass 21 will be read. When reading a document that is placed on the contact glass 21, the scanner 20 is moved to a position facing the contact glass 21. Then, the scanner 20 reads the document placed on the contact glass 21 while scanning in a sub-scanning direction that is perpendicular to the main scanning direction, and acquires image data. The scanner 20 then outputs the acquired image data to the main unit 4.

When the operation buttons 52 of the operation unit 5 are used to give an instruction to read a document in a state in which a document is placed on the document-placement plate 31, a document that is conveyed by the document-feeding unit 3 is read. When reading a document that is conveyed by the document-feeding unit 3, the scanner 20 is moved to a position facing the slit glass 22. Then, the scanner 20 reads the document via the slit glass 22 in synchronization with the conveying operation of the document by the document-feeding unit 3, and acquires image data. The scanner 20 then outputs the acquired image data to the main unit 4.

The main unit 4 includes a paper-feeding unit 41 and a printing unit 42. The paper-feeding unit 41 houses multiple sheets of recording paper. Then, the paper-feeding unit 41 supplies recording paper to the printing unit 42 by feeding the recording paper one sheet at a time. The printing unit 42, for example, forms a latent image on the surface of a photosensitive drum based on a document image. The printing unit 42 performs image formation by forming a toner image from the latent image using toner. The printing unit 42 transfers the toner image from the photosensitive drum to recording paper. The printing unit 42 fixes the toner image to the recording paper, and then discharges the recording paper.

The card reader 6 functions as an ID-reading unit that reads a user ID from an ID card such as an employee ID or the like that of the user.

Figure 2:
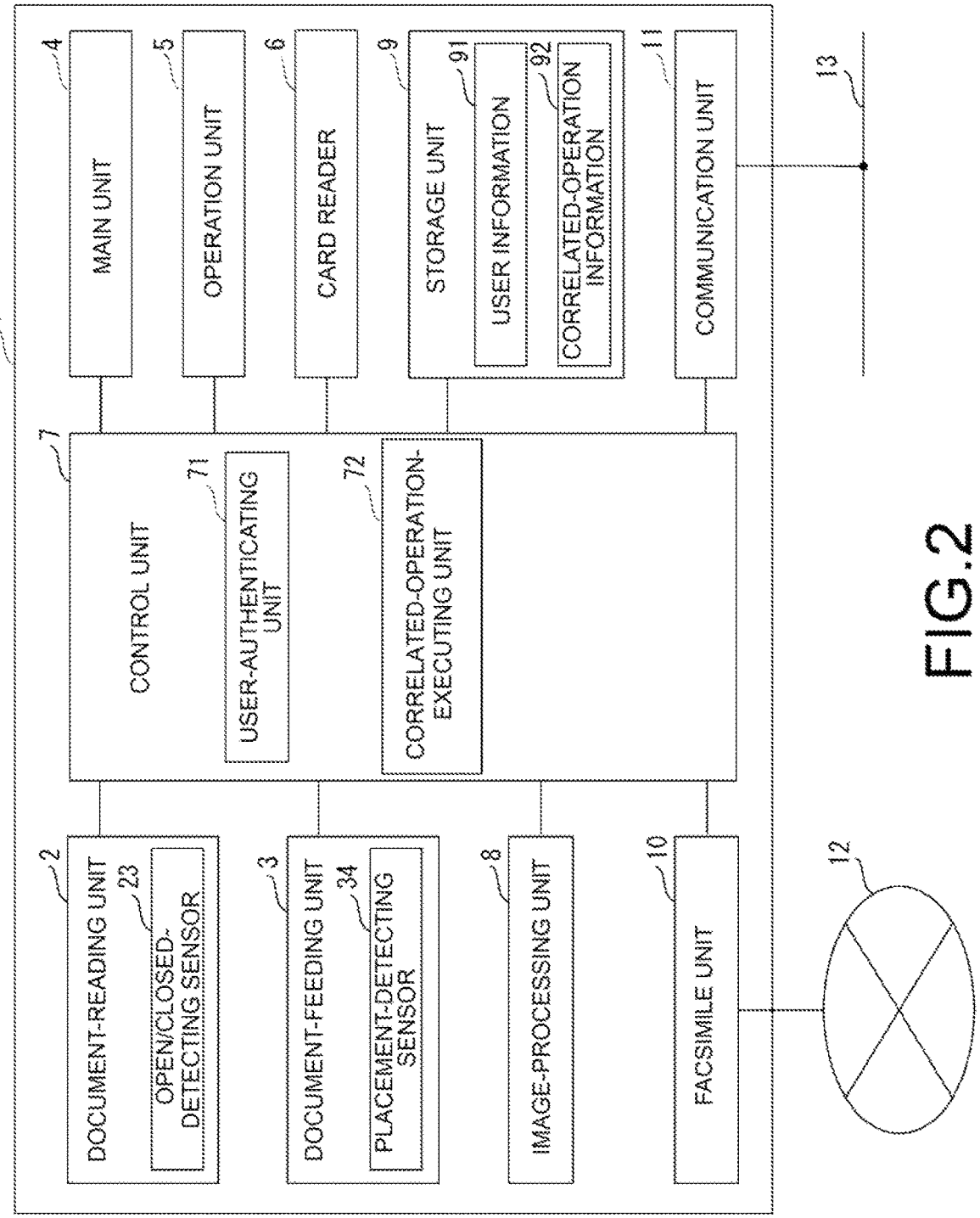
FIG. 2 is a block diagram schematically illustrating the configuration of an embodiment of an image forming apparatus according to the present disclosure.

Referring to FIG. 2, the above-described document-reading unit 2, the document-feeding unit 3, the main unit 4, the operation unit 5 and the card reader 6 are connected to the control unit 7. Then, the operation of these units is controlled by the control unit 7. In addition, an image-processing unit 8, a storage unit 9, a facsimile unit 10 and a communicating unit 11 are connected to the control unit 7.

The image-processing unit 8 is an arithmetic processing circuit such as a microcomputer or the like that includes a central processing unit (CPU), a read only memory (ROM), a random access memory (RAM) and the like. The image-processing unit 8, for example, executes various jobs related to image processing such as enlargement/reduction processing, density adjustment processing, gradation adjustment processing, and the like.

The storage unit 9 is a storage unit such as a semiconductor memory, hard disk drive (HDD), or the like. The storage unit 9 temporarily stores image data that is acquired by reading a document by the document-reading unit 2. Together with this, the storage unit 9 stores various kinds of management information. Moreover, an area for storing image data that is acquired by reading a document by the document-reading unit 2 is also secured.

Figure 3:
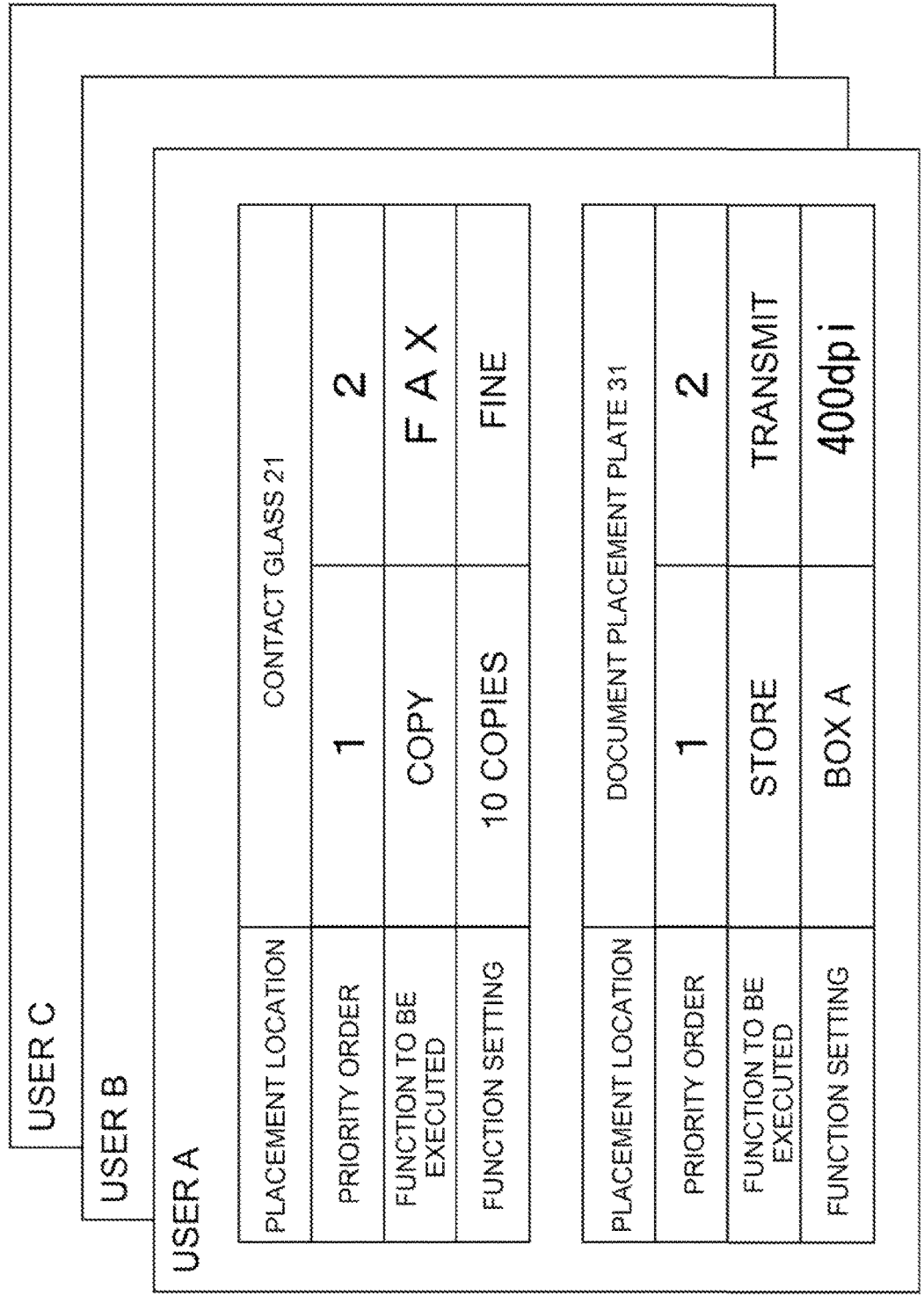
FIG. 3 illustrates an example of correlated-operation information illustrated in FIG. 2.

Furthermore, the storage unit 9 stores user information 91 that correlates a user ID with a user. In addition, the storage unit 9 stores correlated-operation information 92 as illustrated in FIG. 3.

In the correlated-operation information 92, a correlated-operation that includes a "priority order", a "function to be executed" and a "function setting" that are correlated to the "placement location" of a document is registered for each user. The "placement location" indicates either the contact glass 21 or the document-placement plate 31. Incidentally, a plurality of "functions to be executed" can be assigned a "priority order" and registered for one "placement location" in the correlated-operation information 92. In the example illustrated in FIG. 3, a plurality is two. Moreover, the correlated-operation information 92 may be registered beforehand by a user or administrator. The correlated-operation information 92 may be registered such that a user selects oftenly-used functions and settings by referencing a usage history.

The facsimile unit 10 includes a facsimile-transmitting function. The facsimile-transmitting function is a function that generates a facsimile signal from image data that is read by the document-reading unit 2. In addition, the facsimile-transmitting function is a function that transmits a generated facsimile signal via a network 12 such as a telephone network or the like.

The transmitting unit 11 includes a data-transmitting function that transmits image data read by the document-reading unit 2 via a network 13 such as a LAN or the like.

The control unit 7 is an information-processing unit such as a microcomputer or the like that includes a central processing unit (CPU), a read only memory (ROM), a random access memory (RAM), and the like. The ROM stores a control program for performing operation control of the image forming apparatus 1. The control unit 7 reads the control program stored in the ROM. Then, the control unit 7 develops the control program in the RAM. By doing so, the control unit 7 performs overall control of the apparatus according to specified instruction information that is inputted from the operation unit 5.

In addition, the control unit 7 functions as a user-authenticating unit 71 and a correlated-operation-executing unit 72.

The user-authenticating unit 71 authenticates a user by referencing user information 91. This is based on a user ID that is read by the card reader 6. Incidentally, user authentication may be performed by key input from the operation unit 5 or by biometric information such as fingerprints or the like.

Figure 4:
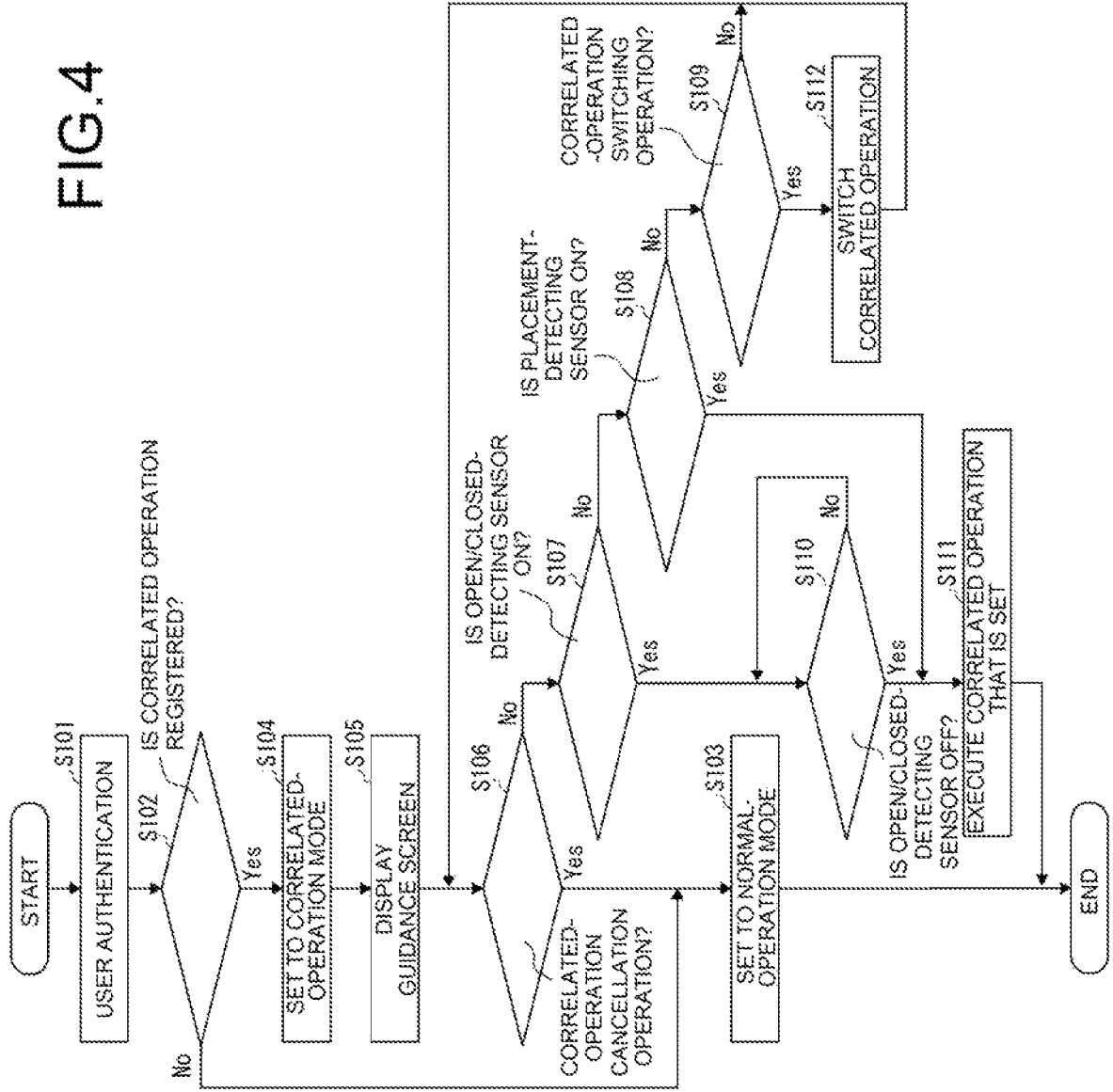
FIG. 4 is a flowchart explaining the correlated operation by a correlated-operation-executing unit illustrated in FIG. 2.

Next, the correlated operation by the correlated-operation-executing unit 72 will be explained in detail with reference to FIG. 4 to FIG. 5B.

After a user ID is read by the card reader 6, the control unit 7 functions as the user-authenticating unit 71. The user-authenticating unit 71 authenticates a user by referencing user information 91 based on the user ID (step S101).

Next, by referencing the correlated-operation information 92, the control unit 7 determines whether or not a correlated-operation that is correlated with the authenticated user is registered (step S102).

In step S102, in the case where a correlated operation is not registered, the control unit 7 sets the normal operation mode that receives function settings and an execution instruction by the operation unit 5 (step S103). As a result, the correlated-operation is not executed, and processing ends.

In step S102, in the case where a correlated operation is registered, the control unit 7 sets the correlated-operation mode (step S104), and functions as the correlated-operation-executing unit 72.

The correlated-operation-executing unit 72 causes the liquid-crystal-display unit 51 to display a guidance screen 100 such as illustrated in FIG. 5A and FIG. 5B (step S105). On the guidance screen 100, a list of correlated operations, and setting-cancellation key 101 are laid out. The list of correlated operations is correlated with the authenticated user and registered in the correlated-operation information 92. The setting-cancellation key 101 receives cancellation of the correlated-operation mode.

Next, the correlated-operation-executing unit 72 monitors operation of the setting-cancellation key 101 (step S106), ON of the open/closed-detecting sensor 23 (step S107), ON of the placement-detecting sensor 34 (step S108), and correlation-switching operation (step S109). ON of the open/closed-detecting sensor 23 is, in other words, opening of the document-feeding unit 3 (pressure plate). ON of the placement-detecting sensor 34 is, in other words, placement of a document on the document-placement plate 31.

In step S106, when operation of the setting-cancellation key 101 is received, the correlated-operation-executing unit 72 advances to step S103 and sets the normal-operation mode. As a result, the correlated-operation mode is cancelled. Incidentally, an existing key such as a clear key, stop key, or the like may function as the setting-cancellation key 101.

In step S107, when the open/closed-detecting sensor 23 is ON and opening of the document-feeding unit 3 (pressure plate) is detected, the correlated-operation-executing unit 72 monitors OFF of the open/closed-detecting sensor 23 (step S110). OFF of the open/closed-detecting sensor 23 is, in other words, closing of the document-feeding unit 3 (pressure plate). Then, in step S110, when the open/closed-detecting sensor 23 is OFF and closing of the document-feeding unit 3 (pressure plate) is detected, the correlated-operation-executing unit 72 executes correlated-operation that corresponds to placement of a document on the contact glass 21 (step S111), and ends the operation.

On the guidance screen 100 illustrated in FIG. 5A, in the correlated-operation that corresponds to placement of a document on the contact glass 21, "copy" is set as the "function to be executed", and No. of copies: 10 copies is set as the "function setting," respectively. Then, the user is notified by a reversed display. Therefore, by the user simply placing a document on the contact glass 21 and closing the document-feeding unit 3 (pressure plate), in step S111, performing 10 copies of the document placed on the contact glass 21 is executed.

In step S108, when the placement sensor 34 is ON and placement of a document on the document-placement plate 31 is detected, the correlated-operation-executing unit 72 advances to step S111, executes the correlated operation that corresponds to placement of a document on the document-placement plate 31, and ends the operation.

On the guidance screen 100 illustrated in FIG. 5A, in the correlated operation that corresponds to placement of a document on the document-placement plate 31, "store" is set as the "function to be executed", and box A that is set in the storage unit 9 as the storage location is set as the "function setting," respectively. Then, the user is notified by a reversed display. Therefore, by the user simply placing a document on the document-placement plate 31, in step S112, image data of the document placed on the contact glass 21 is stored in box A.

In step S109, when a correlation switching operation is received, the correlated-operation-executing unit 72 switches the correlated operation that is executed in steps S111 and S113, then returns to step S106.

When setting the correlated-operation mode in step S104, the correlated-operation-executing unit 72, as illustrated in FIG. 5A, sets the correlated operation having the highest priority as the correlated operation to be executed in steps S111 and S113.

As illustrated by arrow X in FIG. 5A, by touching the "priority order" field on the guidance screen 100, the correlated operation to be executed in steps S111 and S113 is switched as illustrated in FIG. 5B. FIG. 5B illustrates an example in which the "priority order" of the correlated operation that corresponds to placement of a document on the contact glass 21 is 2.

Moreover, as illustrated by arrow Y and Z in FIG. 5A, by touching the fields "function to be executed" and "function setting", it also becomes possible to change the "function to be executed" and the "function setting". In FIG. 5B, an example is illustrated in which the correlated operation that corresponds to the placement of a document on the document-placement plate 31 is switched to "copy" and "150% enlargement".

Incidentally, in this embodiment, configuration is such that mode is set to the normal-operation mode when a correlated operation is not registered for the user, however, a correlated operation for an unregistered user may be set, and a correlated operation may be executed for an unregistered user.

Furthermore, correlated-operation-executing unit 72 may replace the "priority order" of the correlated-operation information 92 according to the execution frequency of the correlated operation. In this case, a history of executed correlated operations is stored, and the "priority order" is set higher the larger the number of times an operation is executed.

As described above, with this embodiment, an image forming apparatus 1 having a document-feeding unit 2 that feeds documents placed on a document-placement plate 31 one sheet at a time, a document-reading unit 2 that reads documents that are fed from the document-feeding unit 3 and documents that are placed on a contact glass 21, and including a plurality of functions that are executed on an image read by the document-reading unit 2 includes: a placement-detecting sensor 34 that detects placement of a document on the document-placement plate 31, an open/closed-detecting sensor 23 that detects opening/closing of a pressure plate (document-feeding unit 3) that opens/closes the contact glass 21, a user-authenticating unit 71 that authenticates a user, a storage unit 9 that stores correlated-operation information 92 in which correlated operations that are correlated with the document-placement plate 31 and the contact glass 21, respectively as document placement locations is registered for each user, and a correlated-operation-executing unit 72 that, by referencing the correlated-operation information 92 of a user authenticated by the user-authenticating unit 71, executes a correlated operation correlated with placement of a document on the document-placement plate 31 when the placement-detecting sensor 34 detects placement of a document on the document-placement plate 31, and executes a correlated operation correlated with placement of a document on the contact glass 21 when the open/closed-detecting sensor 23 detects opening/closing of the pressure plate.

With this configuration, by the user simply placing a document on the contact glass 21 and closing the document-feeding unit 3 (pressure plate), a correlated operation that corresponds to placement of a document on the contact glass 21 is executed. Together with this, by the user simply placing a document on the document-placement plate 31, a correlated operation that corresponds to placement of a document on the document-placement plate 31 is executed. Therefore, by setting standard functions that are used often as correlated operations, the convenience of standard functions that are used often is improved.

Furthermore, in this embodiment, in the correlated-operation information 92, a plurality of correlated operations are correlated with one placement location, and the correlated-operation-executing unit 72 causes a list of correlated operations to be displayed as a guidance screen 100 on a liquid-crystal-display unit 51, and receives switching of correlated operations on the guidance screen 100.

With this configuration, a user can easily select a correlated operation to be executed, and can further improve the convenience of standard functions that are used often.

In addition, in this embodiment, in the correlated-operation information 92, a priority order is set for a plurality of correlated operations correlated for one placement location, and the correlated-operation-executing unit 72 replaces the priority order according to the execution frequency of the correlated operations.

With this configuration, correlated operations that the user executes often are set to have priority, so the convenience of standard functions that are used often can be further improved.

In an image forming apparatus, there are not only cases in which documents are placed on the contact glass, there are also cases in which documents are fed one sheet at a time to a document reading apparatus using a document feeding apparatus and then copied, and also besides copying, there are cases in which the image forming apparatus as a scanner saves data in a storage device. In these cases, in the typical techniques described above, it is difficult to improve workability for users desiring to use different functions.

Moreover, when many users use an image forming apparatus, often the same work is performed using the same settings, and as in other typical techniques, work such as inputting settings to a mobile terminal results in time loss.

Taking the above-described problems into consideration, an object of the present disclosure is to provide an image forming apparatus that can improve the convenience of standard functions that are used often.

With the technique according to the present disclosure, by a user simply placing a document on the contact glass and closing the pressure plate, a correlated operation that corresponds to the placement of a document on the contact glass is executed. Together with that, by a user simply placing a document on the document-placement plate, a correlated operation that corresponds to the placement of a document on the document-placement plate 31 is executed. Therefore, there is an advantage in that by setting standard functions that are used often as correlated operations, the convenience of standard functions that are used often can be improved.

Incidentally, the technique according to the present disclosure is not limited to each of the above-described embodiments, and it is apparent that each of the embodiments can be appropriately modified within the scope of the technical idea of the present disclosure. Moreover, the number, position, shape and the like of the components described above are not limited to those in the embodiments described above, and a number, position, shape and the like suitable for embodying the technique according to the present disclosure may be used. Incidentally, in each of the drawings, the same reference numbers are used for components that are the same.

What is claimed is:

1. An image forming apparatus having a document-feeding unit that feeds documents placed on a document-placement plate one sheet at a time, a document-reading unit that reads documents that are fed from the document-feeding unit and documents that are placed on a contact glass, and including a plurality of functions that are executed on an image read by the document-reading unit, comprising:

a placement-detecting sensor that detects placement of a document on the document-placement plate;

an open/closed-detecting sensor that detects opening/closing of a pressure plate that opens/closes the contact glass;

a user-authenticating unit that authenticates a user;

a storage unit that stores correlated-operation information in which correlated operations that are correlated with the document-placement plate and the contact glass respectively as document placement locations is registered for each user; and a correlated-operation-executing unit that, by referencing the correlated-operation information of a user authenticated by the user-authenticating unit, executes a correlated operation correlated with placement of a document on the document-placement plate when the placement-detecting sensor detects placement of a document on the document-placement plate, and executes a correlated operation correlated with placement of a document on the contact glass when the open/closed-detecting sensor detects opening/closing of the pressure plate.

2. The image forming apparatus according to claim 1, wherein
   in the correlated-operation information, a plurality of correlated operations are correlated with one placement location; and
   the correlated-operation-executing unit causes a list of correlated operations to be displayed as a guidance screen on a display unit, and receives switching of correlated operations on the guidance screen.

3. The image forming apparatus according to claim 2, wherein in the correlated-operation information, a priority order is set for a plurality of correlated operations correlated for one placement location; and
   the correlated-operation-executing unit replaces the priority order according to the execution frequency of the correlated operations.

\* \* \* \* \*